United States Patent
Kawanami et al.

(10) Patent No.: US 10,486,128 B2
(45) Date of Patent: Nov. 26, 2019

(54) HEAT-EXPANDABLE MICROSPHERES AND APPLICATION THEREOF

(71) Applicant: MATSUMOTO YUSHI-SEIYAKU CO., LTD., Yao-shi, Osaka (JP)

(72) Inventors: Satoshi Kawanami, Yao (JP); Yoshitsugu Sasaki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 87 days.

(21) Appl. No.: 15/554,527

(22) PCT Filed: Feb. 19, 2016

(86) PCT No.: PCT/JP2016/054819
§ 371 (c)(1),
(2) Date: Aug. 30, 2017

(87) PCT Pub. No.: WO2016/140080
PCT Pub. Date: Sep. 9, 2016

(65) Prior Publication Data
US 2018/0056267 A1    Mar. 1, 2018

(30) Foreign Application Priority Data
Mar. 5, 2015 (JP) ................. 2015-043252

(51) Int. Cl.
| | |
|---|---|
| *B01J 13/18* | (2006.01) |
| *C08F 2/44* | (2006.01) |
| *C09K 3/00* | (2006.01) |
| *C08F 2/18* | (2006.01) |
| *C08F 220/14* | (2006.01) |
| *C08F 2/20* | (2006.01) |
| *C08F 214/08* | (2006.01) |
| *C08J 9/00* | (2006.01) |
| *C08J 9/32* | (2006.01) |

(52) U.S. Cl.
CPC ............ *B01J 13/18* (2013.01); *B01J 13/185* (2013.01); *C08F 2/18* (2013.01); *C08F 2/20* (2013.01); *C08F 2/44* (2013.01); *C08F 214/08* (2013.01); *C08F 220/14* (2013.01); *C09K 3/00* (2013.01); *C08J 9/0061* (2013.01); *C08J 9/32* (2013.01); *C08J 2203/22* (2013.01); *C08J 2423/08* (2013.01)

(58) Field of Classification Search
CPC . B01J 13/18; B01J 13/185; C08F 2/18; C08F 2/20; C08F 2/44; C08F 220/14; C09K 3/00; C08J 2203/22; C08J 2423/08; C08J 9/0061; C08J 9/32
See application file for complete search history.

(56) References Cited

U.S. PATENT DOCUMENTS

| | | | | |
|---|---|---|---|---|
| 3,615,972 | A * | 10/1971 | Morehouse, Jr. | ........ B01J 13/18 156/276 |
| 5,834,526 | A * | 11/1998 | Wu | ......................... B01J 13/14 521/56 |
| 2003/0114546 | A1 | 6/2003 | Satake et al. | |
| 2012/0064347 | A1 | 3/2012 | Kita et al. | |

FOREIGN PATENT DOCUMENTS

| | | | |
|---|---|---|---|
| EP | 0559254 A1 * | 9/1993 | .............. B01J 13/14 |
| EP | 1811007 A1 | 7/2007 | |
| JP | 2004-210982 A | 7/2004 | |
| JP | 2010-265421 A | 11/2010 | |
| JP | 2011-16884 A | 1/2011 | |
| JP | 2011-68890 A | 4/2011 | |
| JP | 2012-137179 A | 7/2012 | |
| JP | 2014-019750 A | 2/2014 | |

OTHER PUBLICATIONS

International Search Report of PCT/JP2016/054819 dated Apr. 26, 2016 [PCT/ISA/210].
Communication dated Jul. 6, 2018, from the Swedish Patent and Registration Office in counterpart application No. 1751203-9.

\* cited by examiner

*Primary Examiner* — Irina S Zemel
(74) *Attorney, Agent, or Firm* — Sughrue Mion, PLLC

(57) ABSTRACT

Heat-expandable microspheres having an expansion temperature which can be decreased by a simple means without changing the polymerizable monomer and its ratio and/or changing the blowing agent and its ratio, and applications thereof. The heat-expandable microspheres are composed of a thermoplastic resin shell and a core material encapsulated therein. The core material contains a thermally-vaporizable blowing agent which imparts a swelling degree of less than 5% as defined by the following formula (I) and a component (A) which imparts a swelling degree of 5 to 30% as defined by the following formula (I), wherein an amount of the component (A) ranges from 0.0001 to 30 parts by weight to 100 parts by weight of the blowing agent:

Swelling degree (%)=$\{(M_2-M_1)/M_1\} \times 100$    (I)

wherein $M_2$ and $M_1$ are as defined herein.

15 Claims, 1 Drawing Sheet

HEAT-EXPANDABLE MICROSPHERES AND APPLICATION THEREOF

CROSS-REFERENCE TO RELATED APPLICATIONS

This application is a National Stage of International Application No. PCT/JP2016/054819 filed Feb. 19, 2016 which claims priority from Japanese Patent Application No. 2015-043252 filed Mar. 5, 2015, the contents of all of which are incorporated herein by reference in their entirety.

BACKGROUND OF THE INVENTION

1. Field of the Invention

The present invention relates to heat-expandable microspheres and applications thereof. Specifically, the present invention relates to heat-expandable microspheres, a process for producing the heat-expandable microspheres, hollow particles manufactured by expanding the heat-expandable microspheres, a composition containing a base component and at least one particulate material selected from the heat-expandable microspheres and hollow particles, a formed product manufactured by forming the composition, and a process for decreasing the expansion-temperature of the heat-expandable microspheres.

2. Description of the Related Art

Heat-expandable microspheres composed of a thermoplastic resin shell and a blowing agent encapsulated therein, and gasifying at a temperature lower than the softening point of the thermoplastic resin, are generally called heat-expandable microcapsules. The thermoplastic resin usually includes vinylidene chloride polymers, acrylonitrile polymers and acrylate polymers. The blowing agent mainly includes hydrocarbons such as isobutane and isopentane (refer to PTL 1).

The expansion temperature of heat-expandable microspheres can generally be adjusted by changing the polymerizable monomer and its ratio or by changing the encapsulated blowing agent and its ratio. Specifically, heat-expandable microspheres expandable at a lower temperature can be produced with a polymerizable monomer to be polymerized into a homopolymer having a low Tg or a blowing agent having a low boiling point, while heat-expandable microspheres expandable at a higher temperature can be produced with a polymerizable monomer to be polymerized into a homopolymer having a high Tg or a blowing agent having a high boiling point. However, changing the polymerizable monomer and its ratio and/or changing the blowing agent and its ratio require modification of the conditions and parameters for the polymerization reaction through a complicated operation. Thus, there is a need for a simple means for adjusting the expansion temperature of heat-expandable microspheres including an expansion initiation temperature and a maximum expansion temperature.

Heat-expandable microspheres are widely employed as, for example, a foaming agent for foamable inks and automobile undercoating, a lightweight additive for resins and paints, and the like. The recent trend for energy saving requires lower processing temperatures, and it is desirable to develop heat-expandable microspheres that are expandable at lower temperatures.

CITATION LIST

Patent Literature

[PTL 1] U.S. Pat. No. 3,615,972

SUMMARY OF THE INVENTION

It is therefore an object of the present invention to provide heat-expandable microspheres having an expansion temperature which can be decreased by a simple means without changing the polymerizable monomer and its ratio and/or changing the blowing agent and its ratio, and applications thereof. Another object of the present invention is to provide heat-expandable microspheres expandable at a lower temperature in a low expansion temperature region and applications thereof.

Upon diligent study to solve the above problems, the present inventors found that the expansion temperature of heat-expandable microspheres can be decreased by adding a specific amount of a component (A), which specifically influences the thermoplastic resin constituting the shell, to the blowing agent encapsulated in the microspheres, without changing the polymerizable monomer and its ratio and/or changing the blowing agent and its ratio, so as to attain the present invention.

The above objects of the present invention have been achieved by providing heat-expandable microspheres comprising a thermoplastic resin shell and a core material encapsulated therein, the core material containing a thermally-vaporizable blowing agent which imparts a swelling degree of less than 5% as defined by the following formula (I) and containing a component (A) which imparts a swelling degree of 5 to 30% as defined by the following formula (I), wherein an amount of the component (A) ranges from 0.0001 to 30 parts by weight to 100 parts by weight of the blowing agent:

$$\text{Swelling degree (\%)} = \{(M_2 - M_1)/M_1\} \times 100 \tag{I}$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

The heat-expandable microspheres preferably satisfy at least one of the requirements 1) to 6).

1) The component (A) has a solubility parameter ranging from 8 to 15.

2) The component (A) comprises at least one selected from ester compounds and alkyl-substituted aromatic compounds.

3) The thermoplastic resin is obtained by polymerizing a polymerizable component containing a nitrile monomer.

4) The expansion initiation temperature of the heat-expandable microspheres ranges from 50 to 150° C.

5) The maximum expansion temperature of the heat-expandable microspheres ranges from 80 to 200° C.

6) The maximum expansion temperature, $T^1_m$ (° C.), of the heat-expandable microspheres and the maximum expansion temperature, $T^2_m$ (° C.), of the heat-expandable microspheres produced with the same components as that of the former except the component (A) satisfy the following formula (II):

$$T^2_m - T^1_m > 3 \tag{II}$$

The present invention also provides process heat-expandable microspheres comprising a thermoplastic resin shell and a core material encapsulated therein, the process comprising dispersing an oily mixture containing the core material and a polymerizable component into an aqueous dispersion medium and polymerizing the polymerizable component, wherein the core material contains a thermally-vaporizable blowing agent which imparts a swelling degree of less than 5% as defined by the following formula (I) and contains a component (A) which imparts a swelling degree of 5 to 30% as defined by the following formula (I), wherein an amount of the component (A) ranges from 0.0001 to 30 parts by weight to 100 parts by weight of the blowing agent:

$$\text{Swelling degree (\%)} = \{(M_2 - M_1)/M_1\} \times 100 \quad (I)$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

The present invention also provides a temperature-decreasing process for decreasing an expansion temperature of heat-expandable microspheres comprising a thermoplastic resin shell and a core material encapsulated therein, the process comprising dispersing an oily mixture containing the core material and a polymerizable component into an aqueous dispersion medium and polymerizing the polymerizable component, wherein the core material contains a thermally-vaporizable blowing agent which imparts a swelling degree of less than 5% as defined by the following formula (I) and contains a component (A) which imparts a swelling degree of 5 to 30% as defined by the following formula (I), wherein an amount of the component (A) ranges from 0.0001 to 30 parts by weight to 100 parts by weight of the blowing agent:

$$\text{Swelling degree (\%)} = \{(M_2 - M_1)/M_1\} \times 100 \quad (I)$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

The present invention also provides hollow particles manufactured by expanding the heat-expandable microspheres.

The present invention also provides a composition containing a base component and at least one particulate material selected from the heat-expandable microspheres and hollow particles mentioned above.

The present invention also provides a formed product is manufactured by forming the composition mentioned above.

Advantageous Effects of Invention

The expansion temperature of the heat-expandable microspheres of the present invention can be decreased without changing the polymerizable monomer and its ratio and/or changing the blowing agent and its ratio. In addition, the heat-expandable microspheres can be expanded at a lower temperature in a low expansion temperature region.

The hollow particles, composition and formed product of the present invention can be processed or manufactured in a lower expansion temperature region.

The process for decreasing the expansion initiation temperature of the heat-expandable microspheres of the present invention can decrease the expansion temperature of the heat-expandable microspheres without changing the polymerizable monomer and its ratio and/or changing the blowing agent and its ratio.

REFERENCE SYMBOLS LIST

Figure 1:
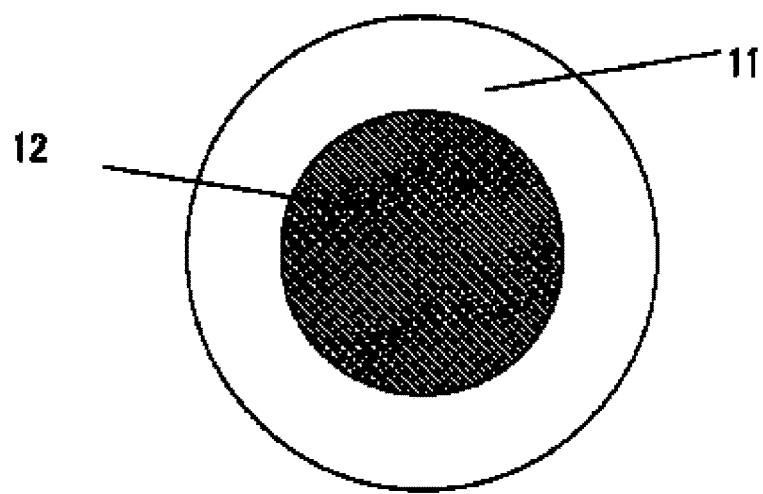
FIG. 1 is a schematic diagram of an example of the heat-expandable microspheres.

Reference symbols used to identify various features in the drawings include the following.

11. Thermoplastic resin shell
12 Core material
1 Hollow particles (fine-particle-coated hollow particles)
2 Shell
3 Hollow
4 Fine particle (in a state of adhesion)
5 Fine particle (in a state of fixation in a dent)

DETAILED DESCRIPTION OF THE PREFERRED EMBODIMENTS

The present invention will next be described in greater detail with reference to the drawings. However, the present invention should not be construed as being limited thereto.

Heat-Expandable Microspheres

As shown in FIG. 1, the heat-expandable microspheres of the present invention comprise a shell 11 of thermoplastic resin and a core material (core) 12 encapsulated therein. The heat-expandable microspheres have a core-shell structure and the whole of each microsphere is thermally expandable (expandable by heating).

The core material contains the thermally-vaporizable blowing agent which imparts a swelling degree of less than 5% as defined by the following formula (I) and contains the component (A) which imparts a swelling degree of 5 to 30% as defined by the following formula (I), wherein the amount of the component (A) ranges from 0.0001 to 30 parts by weight to 100 parts by weight of the blowing agent:

$$\text{Swelling degree (\%)} = \{(M_2 - M_1)/M_1\} \times 100 \quad (I)$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

The swelling degree mentioned here means the swelling degree of the thermoplastic resin imparted by the blowing agent or the component (A) constituting the core material. For selecting "the blowing agent which imparts a swelling degree of less than 5% as defined by the formula (I)", $M_2$ in the formula (I) is determined by immersing a test piece in the blowing agent. For selecting "the component (A) which imparts a swelling degree of 5 to 30% as defined by the formula (I)", $M_2$ in the formula (I) is determined by immersing the test piece in the component (A). The test piece is prepared by polymerizing the same polymerizable component as that of thermoplastic resin constituting the shell of heat-expandable microspheres and forming the resin into a piece 3 cm wide, 5 cm long and 2 mm thick.

The component (A), which imparts a specific swelling degree to the thermoplastic resin shell and is blended in the blowing agent in a specific ratio as mentioned above, plasticizes the thermoplastic resin shell so as to soften the shell at a lower temperature. Thus, the expansion temperature of the heat-expandable microspheres can be easily decreased without changing the polymerizable monomer and its ratio and/or without changing the blowing agent and its ratio. In addition, the heat-expandable microspheres can be expanded at a lower temperature in a low expansion temperature region.

The blowing agent is thermally-vaporizable and imparts a swelling degree of less than 5%. If the blowing agent imparts a swelling degree of 5% or more, the thermoplastic resin shell of the heat-expandable microspheres is excessively plasticized and the expansion performance of the microspheres may be impaired. The swelling degree imparted by the blowing agent is preferably not higher than 4.5%, more preferably not higher than 4.0%, further more preferably not higher than 3.5% and most preferably not higher than 3.0%.

The boiling point of the blowing agent must be lower than the softening point of the thermoplastic resin shell though it is not specifically restricted. The boiling point preferably ranges from −30 to 100° C., more preferably from −25 to 90° C., further more preferably from −20 to 80° C., and most preferably from −15 to 70° C. The blowing agent having a boiling point higher than 100° C. may not contribute to a sufficient decrease of the expansion temperature so as to fail to attain the effect of the present invention.

The blowing agent has a solubility parameter preferably ranging from 5 to 8, more preferably from 5.5 to 7.9, further more preferably from 6 to 7.8 and most preferably from 6 to 7.7.

The blowing agent includes, for example, straight-chain hydrocarbons, such as propane, butane, pentane, hexane, heptane, octane, nonane, decane, dodecane, tridecane, tetradecane, pentadecane, and hexadecane; branched hydrocarbons, such as isobutane, isopentane, isohexane, isoheptane, isooctane, isononane, isodecane, isododecane, 3-methyl undecane, isotridecane, 4-mehtyl dodecane, isotetradecane, isopentadecane, isohexadecane, 2, 2, 4, 4, 6, 8, 8-heptamethylnonane, isoheptadecane, and isooctadecane; alicyclic hydrocarbons, such as cyclopentane, cyclohexane, cycloheptane, cyclooctane, cyclononane, cyclodecane and cyclododecane; petroleum ethers; halides of the petroleum ethers; fluorine-containing compounds, such as hydrofluoroether; tetraalkyl silane; and compounds which thermally decompose to generated gases. The blowing agent may be any of straight-chain, branched or alicyclic compounds, and is preferably be an aliphatic compound. The blowing agents may be used alone or a combination of at least two of the blowing agents may be used.

Of those blowing agents, preferable blowing agents for attaining an enhanced effect of the present invention are straight-chain hydrocarbons such as propane, butane, pentane, hexane and heptane; branched hydrocarbons such as isobutane, isopentane, isohexane, isoheptane and isooctane; alicyclic hydrocarbons such as cyclopentane and cyclohexane; petroleum ethers; halides of the petroleum ethers; fluorine-containing compounds such as hydrofluoroether; and tetraalkyl silane.

The component (A) imparts a swelling degree ranging from 5 to 30%. The swelling degree imparted by the component (A) preferably ranges from 5 to 25%, more preferably from 5 to 20%, further more preferably from 5 to 15% and most preferably from 7 to 15%. If the component (A) imparts a swelling degree of less than 5%, the component (A) may not contribute to a sufficient decrease of the expansion temperature. On the other hand, if the component (A) imparts more than a swelling degree of 30%, the thermoplastic resin shell of the heat-expandable microspheres is excessively plasticized and the expansion performance of the microspheres may be deteriorated.

The boiling point of the component (A) preferably is higher than 100° C., more preferably not lower than 103° C., further more preferably not lower than 105° C., and most preferably not lower than 110° C. The component (A) having a boiling point lower than 100° C. may function as a blowing agent rather than the plasticizer and not contribute to a sufficient decrease of the expansion temperature. The upper limit of the boiling point of the component (A) is 500° C.

The component (A) has a solubility parameter preferably ranging from 8 to 14, more preferably from 8 to 13, further more preferably from 8 to 12 and most preferably from 8.5 to 11. The component (A) having a solubility parameter beyond the widest range may not sufficiently decrease the expansion temperature of the heat-expandable microspheres so as to fail to attain the effect of the present invention.

The solubility parameter is calculated by the following formula from the molar heat of vaporization and molar volume of an atomic group or functional group determined by Fedors as described in "Application of Solubility Parameters (published by Johokiko Co., Ltd, 2007, P14)".

$$\text{solubility parameter}(\delta)=(\Sigma\Delta H/\Sigma\Delta V)^{1/2} \qquad \text{[Formula 1]}$$

where $\Delta H$ is molar heat of vaporization (cal) and $\Delta V$ is molar volume (cm$^3$)

The component (A) includes, for example, ester compounds and alkyl-substituted aromatic compounds. One of or a combination of those compounds may be used as the component (A). The component (A) may be added as one of the ingredients for producing the heat-expandable microspheres, or may be contained in a blend which is included in the ingredients or contained in an ingredient as an impurity.

The alkyl-substituted aromatic compounds include toluene, ethyl benzene, and xylene including o-xylene, m-xylene and p-xylene.

The ester compounds include benzoate esters, phthalate esters, adipate esters, fumarate esters, maleate esters, oleate esters, sebacate esters, azelate esters, succinate esters, phosphate esters, citrate esters, trimellitate esters and polyesters.

The benzoate esters include methyl benzoate, ethyl benzoate, propyl benzoate, isopropyl benzoate, butyl benzoate, isobutyl benzoate, pentyl benzoate, isopentyl benzoate, hexyl benzoate, isohexyl benzoate, heptyl benzoate, isoheptyl benzoate, octyl benzoate, isooctyl benzoate, nonyl benzoate, isononyl benzoate, decyl benzoate, isodecyl benzoate, undecyl benzoate, dodecyl benzoate, phenyl benzoate, and benzyl benzoate.

The phthalate esters include, for example, dimethyl phthalate, diethyl phthalate, dipropyl phthalate, diisopropyl phthalate, dibutyl phthalate, diisobutyl phthalate, dipentyl phthalate, diisopentyl phthalate, dihexyl phthalate, diisohexyl phthalate, diheptyl phthalate, diisoheptyl phthalate, dioctyl phthalate, diisooctyl phthalate, di-2-ethylhexyl phthalate, dinonyl phthalate, diisononyl phthalate, didecyl phthalate, diisodecyl phthalate, diundecyl phthalate, didodecyl phthalate, diphenyl phthalate, dibenzyl phthalate, benzylbutyl phthalate, benzyloctyl phthalate, bis(2-butoxyethyl) phthalate, dimethyl isophthalate, diethyl isophthalate, dipropyl isophthalate, diisopropyl isophthalate, dibutyl isophthalate, diisobutyl isophthalate, dipentyl isophthalate, diisopentyl isophthalate, dihexyl isophthalate, diisohexyl isophthalate, diheptyl isophthalate, diisoheptyl isophthalate, dioctyl isophthalate, diisooctyl isophthalate, di-2-ethylhexyl isophthalate, dinonyl isophthalate, diisononyl isophthalate, didecyl isophthalate, diisodecyl isophthalate, diundecyl isophthalate, didodecyl isophthalate, diphenyl isophthalate, dibenzyl isophthalate, dimethyl terephthalate, diethyl terephthalate, dipropyl terephthalate, diisopropyl terephthalate, dibutyl phthalate, diisobutyl terephthalate, dipentyl terephthalate, diisopentyl terephthalate, dihexyl terephthalate, diisohexyl terephthalate, diheptyl terephthalate, diisoheptyl terephthalate, dioctyl terephthalate, diisooctyl terephthalate, di-2-ethylhexyl terephthalate, dinonyl terephthalate, diisononyl terephthalate, didecyl terephthalate, diisodecyl terephthalate, diundecyl terephthalate, didodecyl terephthalate, diphenyl terephthalate, and dibenzyl terephthalate.

The adipate esters include, for example, dimethyl adipate, diethyl adipate, dipropyl adipate, diisopropyl adipate, dibutyl adipate, diisobutyl adipate, dipentyl adipate, diisopentyl adipate, dihexyl adipate, diisohexyl adipate, diheptyl adipate, diisoheptyl adipate, dioctyl adipate, diisooctyl adipate, dinonyl adipate, diisononyl adipate, didecyl adipate, diisodecyl adipate, diphenyl adipate, and dibenzyl adipate.

The fumarate esters include, for example, dimethyl fumarate, diethyl fumarate, dipropyl fumarate, diisopropyl fumarate, dibutyl fumarate, diisobutyl fumarate, dipentyl fumarate, diisopentyl fumarate, dihexyl fumarate, diisohexyl fumarate, diheptyl fumarate, diisoheptyl fumarate, dioctyl fumarate, diisooctyl fumarate, dinonyl fumarate, diisononyl fumarate, didecyl fumarate, diisodecyl fumarate, diphenyl fumarate, and dibenzyl fumarate.

The maleate esters include, for example, dimethyl maleate, diethyl maleate, dipropyl maleate, diisopropyl maleate, dibutyl maleate, diisobutyl maleate, dipentyl maleate, diisopentyl maleate, dihexyl maleate, diisohexyl maleate, diheptyl maleate, diisoheptyl maleate, dioctyl maleate, diisooctyl maleate, dinonyl maleate, diisononyl maleate, didecyl maleate, diisodecyl maleate, diphenyl maleate, and dibenzyl maleate.

The oleate esters include, for example, dimethyl oleate, diethyl oleate, dipropyl oleate, diisopropyl oleate, dibutyl oleate, diisobutyl oleate, dipentyl oleate, diisopentyl oleate, dihexyl oleate, diisohexyl oleate, diheptyl oleate, diisoheptyl oleate, dioctyl oleate, diisooctyl oleate, dinonyl oleate, diisononyl oleate, didecyl oleate, diisodecyl oleate, diphenyl oleate, and dibenzyl oleate.

The sebacate esters include, for example, dimethyl sebacate, diethyl sebacate, dipropyl sebacate, diisopropyl sebacate, dibutyl sebacate, diisobutyl sebacate, dipentyl sebacate, diisopentyl sebacate, dihexyl sebacate, diisohexyl sebacate, diheptyl sebacate, diisoheptyl sebacate, dioctyl sebacate, diisooctyl sebacate, dinonyl sebacate, diisononyl sebacate, didecyl sebacate, diisodecyl sebacate, diphenyl sebacate, and dibenzyl sebacate.

The azelate esters include, for example, dimethyl azelate, diethyl azelate, dipropyl azelate, diisopropyl azelate, dibutyl azelate, diisobutyl azelate, dipentyl azelate, diisopentyl azelate, dihexyl azelate, diisohexyl azelate, diheptyl azelate, diisoheptyl azelate, dioctyl azelate, diisooctyl azelate, dinonyl azelate, diisononyl azelate, didecyl azelate, diisodecyl azelate, diphenyl azelate, and dibenzyl azelate.

The succinate esters include, for example, dimethyl succinate, diethyl succinate, dipropyl succinate, diisopropyl succinate, dibutyl succinate, diisobutyl succinate, dipentyl succinate, diisopentyl succinate, dihexyl succinate, diisohexyl succinate, diheptyl succinate, diisoheptyl succinate, dioctyl succinate, diisooctyl succinate, dinonyl succinate, diisononyl succinate, didecyl succinate, diisodecyl succinate, diphenyl succinate, and dibenzyl succinate.

The phosphate esters include, for example, trimethyl phosphate, triethyl phosphate, tripropyl phosphate, triisopropyl phosphate, tributyl phosphate, triisobutyl phosphate, tripentyl phosphate, triisopentyl phosphate, trihexyl phosphate, triisohexyl phosphate, triheptyl phosphate, triisoheptyl phosphate, trioctyl phosphate, triisooctyl phosphate, tris(2-ethylhexyl) phosphate, trinonyl phosphate, triisononyl phosphate, tridecyl phosphate, triisodecyl phosphate, triphenyl phosphate, tribenzyl phosphate, tricresyl phosphate, trixylenyl phosphate, cresyldiphenyl phosphate, 2-ethylhexyldiphenyl phosphate, tris(2-chloroethyl) phosphate, tris(1,3-dichloro-2-phenyl) phosphate, and tris(2-butoxyehtyl) phosphate.

The citrate esters include, for example, trimethyl citrate, triethyl citrate, tripropyl citrate, triisopropyl citrate, tributyl citrate, triisobutyl citrate, tripentyl citrate, triisopentyl citrate, trihexyl citrate, triisohexyl citrate, triheptyl citrate, triisoheptyl citrate, trioctyl citrate, triisooctyl citrate, trinonyl citrate, triisononyl citrate, tridecyl citrate, triisodecyl citrate, triphenyl citrate, tribenzyl citrate, acetyl trimethyl citrate, acetyl triethyl citrate, acetyl tripropyl citrate, acetyl triisopropyl citrate, acetyl tributyl citrate, acetyl triisobutyl citrate, acetyl tripentyl citrate, acetyl triisopentyl citrate, acetyl trihexyl citrate, acetyl triisohexyl citrate, acetyl triheptyl citrate, acetyl triisoheptyl citrate, acetyl trioctyl citrate, acetyl triisooctyl citrate, acetyl trinonyl citrate, acetyl triisononyl citrate, acetyl tridecyl citrate, acetyl triisodecyl citrate, acetyl triphenyl citrate, and acetyl tribenzyl citrate.

The trimellitate esters include, for example, trimethyl trimellitate, triethyl trimellitate, tripropyl trimellitate, triisopropyl trimellitate, tributyl trimellitate, triisobutyl trimellitate, tripentyl trimellitate, triisopentyl trimellitate, trihexyl trimellitate, triisohexyl trimellitate, triheptyl trimellitate, triisoheptyl trimellitate, trioctyl trimellitate, triisooctyl trimellitate, trinonyl trimellitate, triisononyl trimellitate, tridecyl trimellitate, triisodecyl trimellitate, triphenyl trimellitate, and tribenzyl trimellitate.

The polyesters include aliphatic esters, which are the condensates of aliphatic carboxylic acids and alcohols, and aromatic esters, which are the condensates of aromatic carboxylic acids and alcohols.

Of those compounds, toluene, phthalate esters, adipate esters and citrate esters are preferable for the component (A) for attaining an enhanced effect of the present invention, and toluene and citrate esters are further more preferable.

The amount of the component (A) in the core material ranges from 0.0001 to 30 parts by weight to 100 parts by weight of the blowing agent. An amount of the component (A) lower than 0.0001 parts by weight may not contribute to a sufficient decrease of the expansion temperature of the resultant heat-expandable microspheres. On the other hand, an amount of the component (A) higher than 30 parts by weight may cause an excessively plasticized thermoplastic resin shell to impair the expansion performance of the resultant heat-expandable microspheres. The amount of the component (A) preferably ranges from 0.001 to 30 parts by weight, more preferably from 0.01 to 30 parts by weight, further more preferably from 0.1 to 30 parts by weight, yet further more preferably from 1 to 25 parts by weight, still further more preferably from 2 to 20 parts by weight and most preferably from 4 to 20 parts by weight.

The thermoplastic resin constituting the shell of the heat-expandable microspheres is obtained by polymerizing the polymerizable component. The polymerizable component essentially contains a monomer component and may contain a cross-linking agent. The monomer component mentioned herein means a radically-polymerizable monomer having a polymerizable double bond per molecule and can be polymerized by addition polymerization. The cross-linking agent is a radically-polymerizable monomer having at least two polymerizable double bonds per molecule and introduces a cross-linked structure into the thermoplastic resin. One of or a combination of at least two of those radically-polymerizable monomers can be employed for preparing the polymerizable component.

The monomer component includes, for example, nitrile monomers such as acrylonitrile, methacrylonitrile, α-chloroacrylonitrile, α-ethoxyacrylonitrile and fumaronitrile; vinylidene chloride; vinyl halide monomers, such as vinyl chloride, vinyl bromide and vinyl fluoride; vinyl ester monomers, such as vinyl acetate, vinyl propionate and vinyl butyrate; (meth)acrylate monomers, such as methyl (meth)acrylate, ethyl (meth)acrylate, n-butyl (meth)acrylate, isobutyl (meth)acrylate, t-butyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobornyl (meth)acrylate, cyclohexyl (meth)acrylate, benzyl (meth)acrylate, β-carboxyethyl (meth)acrylate, 2-hydroxyethyl (meth)acrylate and 2-hydroxypropyl (meth)acrylate; carboxyl-containing monomers such as acrylic acid, methacrylic acid, itaconic acid, maleic acid, fumaric acid, and citraconic acid; styrene monomers, such as styrene and chlorostyrene; acrylamide monomers, such as acrylamide, substituted acrylamide, methacrylamide and substituted methacrylamide; maleimide monomers, such as N-phenyl maleimide, N-(2-chlorophenyl) maleimide, N-cyclohexyl maleimide and N-lauryl maleimide; styrene monomers, such as styrene, α-methyl styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, n-methoxystyrene, p-phenyl styrene, p-chlorostyrene, and 3,4-dichlorostyrene; ethylenically unsaturated monoolefin monomers, such as ethylene, propylene, butylene, and isobutylene; vinyl ether monomers, such as vinyl methyl ether, vinyl ethyl ether and vinyl isobutyl ether; vinyl ketone monomers, such as vinyl methyl ketone, vinyl hexyl ketone, and methyl isopropenyl ketone; N-vinyl monomers, such as N-vinyl pyrrole, N-vinyl carbazole, N-vinyl indole, and N-vinyl pyrolidone; and vinyl naphthalene salts. A part of or the whole of the carboxyl groups in the carboxyl-containing monomers may be neutralized in the polymerization reaction. The term, "(meth)acryl", means acryl or methacryl. The maleimide monomers should preferably be N-substituted maleimide monomers in which the nitrogen atom has a substituent group.

Of those monomers, nitrile monomers are preferably contained in the polymerizable component. The polymerizable component essentially containing the nitrile monomers contributes to an improved gas barrier effect and a widened expansion temperature range of the resultant heat-expandable microspheres.

The amount of the nitrile monomers in the polymerizable component is not specifically restricted and preferably ranges from 5 to 95 wt %, more preferably from 10 to 95 wt %, further more preferably from 15 to 95 wt %, yet further more preferably from 20 to 95 wt % and most preferably from 25 to 95 wt %.

The polymerizable component more preferably contains a vinylidene chloride monomer and/or (meth) acrylate monomer in addition to the nitrile monomer. The polymerizable component containing the vinylidene chloride contributes to a more improved gas barrier effect and expansion performance in low expansion temperature region of the resultant heat-expandable microspheres. The polymerizable component containing the (meth) acrylate monomer contributes to an easily adjustable expansion behavior of the resultant heat-expandable microspheres.

The amount of the vinylidene chloride in the polymerizable component is not specifically restricted and preferably ranges from 1 to 90 wt %, more preferably from 5 to 85 wt %, further more preferably from 10 to 80 wt %, yet further more preferably from 20 to 75 wt % and most preferably from 30 to 70 wt %.

The amount of the (meth)acrylate monomer in the polymerizable component is not specifically restricted and preferably ranges from 0.01 to 70 wt %, more preferably from 0.01 to 65 wt %, further more preferably from 0.1 to 60 wt %, yet further more preferably from 0.1 to 55 wt % and most preferably from 0.1 to 50 wt %.

The polymerizable component more preferably contains a carboxyl-containing monomer in addition to the nitrile monomer. This is because the carboxyl-containing monomer is effective in increasing the glass-transition temperature of the resultant thermoplastic resin shell to make the heat-expandable microspheres expandable at a high temperature. The polymerizable component containing a maleimide monomer in addition to those monomers is preferable for minimized coloring of the resultant heat-expandable microspheres.

The amount of the carboxyl-containing monomer in the polymerizable component is not specifically restricted and preferably ranges from 0.01 to 70 wt %, more preferably from 0.1 to 60 wt %, further more preferably from 1 to 50 wt %, yet further more preferably from 3 to 50 wt % and most preferably from 5 to 50 wt %.

The amount of the maleimide monomer in the polymerizable component is not specifically restricted and preferably ranges from 0.01 to 50 wt %, more preferably from 0.1 to 40 wt %, further more preferably from 1 to 30 wt %, yet further more preferably from 3 to 25 wt % and most preferably from 5 to 20 wt %.

The monomer component containing a monomer having halogen, oxygen or nitrogen atom can effectively prevent the agglomeration of heat-expandable microspheres in polymerization reaction and the generation of scale in the reactor.

The polymerizable component may contain a polymerizable monomer (cross-linking agent) having at least two polymerizable double bond per molecule in addition to the monomers mentioned above. The polymerizable component polymerized with the cross-linking agent will control the decrease of the ratio of the blowing agent retained in thermally expanded microspheres (retention ratio of the blowing agent encapsulated in microspheres) and achieve efficient thermal expansion of the microspheres.

The cross-linking agent is not specifically restricted, and includes, for example, aromatic divinyl compounds, such as divinylbenzene and divinyl naphthalene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1, 10-decanediol di(meth)acrylate, PEG (200) di(meth)acrylate, PEG (400) di(meth)acrylate, PEG (600) di(meth)acrylate, neopentyl glycol di(meth)acrylate, 1,6-hexanediol di(meth)acrylate, trimethylolpropane trimethacrylate, glycerin dimethacrylate, dimethylol-tricyclodecane diacrylate, pentaerythritol tri(meth)acrylate, pentaerythritol tetraacrylate, dipentaerythritol hexaacrylate, neopentyl glycol-acrylic acid-benzoate ester, trimethylol propane-acrylic acid-benzoate ester, 2-hydroxy-3-acryloyloxy propyl methacrylate, hydroxypivalic acid neopentylglycol diacrylate, ditrimethylolpropane tetraacrylate, and 2-butyl-2-ethyl-1,3-propanediol diacrylate. One of or a combination of at least two of those cross-linking agents may be used. The compounds expressed as "PEG (XXX) di(meth) acrylate" are polyethyleneglycol di(meth) acrylates, and the numbers in the parentheses represent the average molecular weight of the polyethylene glycol moiety.

The amount of the cross-linking agent, which is not an essential component, is not specifically restricted, and preferably ranges from 0 to 3.0 parts by weight to 100 parts by weight of the monomer component, more preferably from 0.02 to 1.5 parts by weight and further more preferably from 0.02 to 1.0 parts by weight in order to optimize the degree of cross linking, retention ratio of the blowing agent encapsulated in heat-expandable microspheres, and heat resistance and thermal expansion performance of the resultant heat-expandable microspheres.

The expansion-initiation temperature (T's) of the heat-expandable microspheres is not specifically restricted, and preferably ranges from 50 to 150° C., more preferably from 55 to 145° C., further more preferably from 60 to 140° C., yet further more preferably from 60 to 135° C., and most preferably from 60 to 130° C. The heat-expandable microspheres having an expansion-initiation temperature lower than 50° C. may exhibit poor storage stability. On the other hand, the heat-expandable microspheres having an expansion-initiation temperature higher than 150° C. may not expand at a low temperature expected.

The maximum expansion temperature ($T^1$m) of the heat-expandable microspheres is not specifically restricted, and preferably ranges from 80 to 200° C., more preferably from 85 to 190° C., further more preferably from 90 to 185° C., and most preferably from 95 to 180° C. The heat-expandable microspheres having a $T^1$m lower than 80° C. have an excessively narrow range of expansion temperature which leads to difficulty in adjusting the expansion. On the other hand, heat-expandable microspheres having a $T^1$m higher than 200° C. may not expand at a low temperature as expected.

The heat-expandable microspheres of the present invention preferably have a thermal expansion performance satisfying the following formula (II) where $T^1_m$, (° C.) is the maximum expansion temperature of the heat-expandable microspheres of the present invention and $T^2_m$ (° C.) is the maximum expansion temperature of the heat-expandable microspheres produced with the same components as those of the former except the component (A).

$$T^2_m - T^1_m > 3 \tag{II}$$

The "heat-expandable microspheres produced with the same components as those of the former except the component (A)" are microspheres produced with the same component as those of the heat-expandable microspheres of the present invention having the maximum expansion temperature, $T^1_m$, except that the component (A) is not used for the production.

The value of the formula, $T^2_m - T^1_m$, is preferably at least 3, more preferably at least 4 and further more preferably at least 5, and the upper limit of the value is 30. It is not preferable to add the component (A) in an amount that causes the value of the formula to be higher than the upper limit. This is because it will result in an undesirably decreased retention ratio of the blowing agent encapsulated in the heat-expandable microspheres.

The heat-expandable microspheres of the present invention preferably have a thermal expansion performance satisfying the following formula (III) where $T^1_s$ (° C.) is the expansion-initiation temperature of the heat-expandable microspheres of the present invention and $T^2_s$ (° C.) is the expansion-initiation temperature of the heat-expandable microspheres produced with the same components as those of the former except the component (A).

$$T^2_s - T^1_s > 1 \tag{III}$$

The value of the formula, $T^2_s - T^1_s$, is preferably at least 1, more preferably at least 1.5 and further more preferably at least 2, and the upper limit of the value is 30. It is not preferable to add the component (A) is an amount that causes the value of the formula to be higher than the upper limit. This is because it will result in undesirably decreased retention ratio of the blowing agent encapsulated in the heat-expandable microspheres.

The mean particle size of the heat-expandable microspheres is not specifically restricted, and preferably ranges from 1 to 100 μm, more preferably from 3 to 80 μm, further more preferably from 7 to 60 μm, and most preferably from 10 to 50 μm. The heat-expandable microspheres having a mean particle size smaller than 1 μm may have a low expansion performance. On the other hand, the heat-expandable microspheres having a mean particle size greater than 100 μm may have a low packing efficiency and exhibit poor workability when mixed with a resin.

The coefficient of variation, CV, of the particle size distribution of the heat-expandable microspheres is not specifically restricted, and is preferably not greater than 50%, more preferably not greater than 45%, and most preferably not greater than 40%. The CV can be obtained by the following formulae (1) and (2).

[Formula 2]

$$CV = (s/\langle x \rangle) \times 100 \, (\%) \tag{1}$$

$$s = \left\{ \sum_{i=1}^{n} (xi - \langle x \rangle)^2 / (n-1) \right\}^{1/2} \tag{2}$$

(where s is a standard deviation of the particle size of the microspheres, <x> is a mean particle size of the microspheres, "xi" is the particle size of the i-th particle, and n represents the number of particles)

The encapsulation ratio of the blowing agent is defined as the weight percentage of the blowing agent to the weight of the heat-expandable microspheres in which the blowing agent is encapsulated. The encapsulation ratio of the blowing agent is not specifically restricted, and preferably ranges from 1 to 50 wt % of the weight of the heat-expandable microspheres, more preferably from 2 to 45 wt %, further more preferably from 5 to 40 wt %, and most preferably from 10 to 30 wt %.

The maximum expansion ratio of the heat-expandable microspheres is not specifically restricted, and is preferably at least 3 times, more preferably at least 10 times, yet more preferably at least 20 times, further more preferably at least 30 times, yet further more preferably at least 50 times, and most preferably at least 70 times. On the other hand, the upper limit of the maximum expansion ratio is preferably 200 times.

When the heat-expandable microspheres are required to be thermally expanded into pressure-resistant hollow particles, the maximum expansion ratio of the heat-expandable microspheres is preferably at least 3 times and the upper limit of the maximum expansion ratio is preferably 100 times in order to make hollow particles having a sufficiently thick shell. The heat-expandable microspheres having a maximum expansion ratio lower than 3 times may fail to sufficiently reduce the density of the material blended with the microspheres, while the heat-expandable microspheres having a maximum expansion ratio higher than 100 times may be processed into hollow particles having an insufficient pressure resistance.

When a resin composition containing the heat-expandable microspheres is heated and expanded into a lightweight article, the maximum expansion ratio of the heat-expandable microspheres is preferably at least 20 times and the upper limit of the maximum expansion ratio is preferably 200 times. The heat-expandable microspheres having a maximum expansion ratio lower than 20 times may cause insufficient expansion of the resultant product containing the heat-expandable microspheres, while the heat-expandable microspheres having a maximum expansion ratio higher than 200 times may cause a rough surface of the resultant product containing the heat-expandable microspheres.

The heat-expandable microspheres of the present invention can be used for blending with pastes, such as vinyl chloride paste, and liquid compositions, such as EVA emulsion, acrylate emulsion and solvent binders. The microspheres can also be employed in molding processes, such as injection molding, extrusion molding, calendaring, blow molding, compaction molding, vacuum molding and thermal molding.

Process for Producing Heat-Expandable Microspheres

The process for producing heat-expandable microspheres of the present invention includes the steps of dispersing an oily mixture containing the core material and polymerizable component in an aqueous dispersion medium, and polymerizing the polymerizable component (hereinafter also referred to as the polymerization step). The core material contains the thermally-vaporizable blowing agent which imparts a swelling degree of less than 5% as defined by the formula (I) mentioned above and contains the component (A) which imparts a swelling degree of 5 to 30% as defined by the formula (I) mentioned above, wherein the amount of the component (A) ranges from 0.0001 to 30 parts by weight to 100 parts by weight of the blowing agent. The details of the polymerizable component, blowing agent, component (A) and heat-expandable microspheres are described above.

In the production process of the present invention, the polymerizable component is preferably polymerized in the presence of a polymerization initiator.

The polymerization initiator is not specifically restricted, and includes peroxides and azo compounds generally used.

The peroxides include, for example, peroxydicarbonates, such as diisopropyl peroxydicarbonate, di-sec-butyl peroxydicarbonate, di-(2-ethylhexyl) peroxydicarbonate and dibenzyl peroxydicarbonate; diacyl peroxides, such as lauroyl peroxide and benzoyl peroxide; ketone peroxides, such as methylethyl ketone peroxide and cyclohexanone peroxide; peroxyketals, such as 2,2-bis(t-butyl peroxy) butane; hydroperoxides, such as cumene hydroperoxide and t-butyl hydroperoxide; dialkyl peroxides, such as dicumyl peroxide and di-t-butyl peroxide; peroxyesters, such as t-hexyl peroxypivalate and t-butyl peroxyisobutylate.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate), 2,2'-azobis(2-methyl butyl onitril e) and 1,1'-azobis(cyclohexane-1-carbonitrile).

The amount of the polymerization initiator preferably ranges from 0.05 to 10 wt % of 100 parts by weight of the polymerizable component, more preferably from 0.1 to 8 wt %, and most preferably from 0.2 to 5 wt %. An amount of the polymerization initiator lower than 0.05 wt % may increase the amount of the polymerizable component which is not polymerized in the process. On the other hand, an amount of the polymerization initiator higher than 10 wt % may reduce the retention ratio of the core material encapsulated in the resultant heat-expandable microspheres.

In the production process of the present invention, the oily mixture is dispersed in the aqueous dispersion medium to be prepared into an aqueous suspension, in which the polymerizable component is polymerized.

The aqueous dispersion medium contains water, such as deionized water, as the main component to disperse the oily mixture. The medium may further contain alcohols, such as methanol, ethanol and propanol, and hydrophilic organic solvents, such as acetone. The hydrophilic property mentioned in the present invention means a property of a substance or mixture optionally miscible in water. The amount of the aqueous dispersion medium used in the process is not specifically restricted, and preferably ranges from 100 to 1000 parts by weight to 100 parts by weight of the polymerizable component.

The aqueous dispersion medium may further contain an electrolyte, such as sodium chloride, magnesium chloride, calcium chloride, sodium sulfate, magnesium sulfate, ammonium sulfate, and sodium carbonate. One of or a combination of at least two of these electrolytes may be used. The amount of the electrolyte is not specifically restricted, and preferably ranges from 0.1 to 50 parts by weight to 100 parts by weight of the aqueous dispersion medium.

The aqueous dispersion medium may contain at least one water-soluble compound selected from the group consisting of polyalkylene imines having a nitrogen atom bonded with an alkyl group substituted with a hydrophilic functional group selected from carboxylic acid (salt) groups and phosphonic acid (salt) groups; water-soluble 1,1-substitution compounds having a carbon atom bonded with a hetero atom and with a hydrophilic functional group selected from the group consisting of hydroxyl group, carboxylic acid (salt) groups and phosphonic acid (salt) groups; potassium dichromate; alkali metal nitrite salts; metal (III) halides; boric acid; water-soluble ascorbic acids; water-soluble polyphenols; water-soluble vitamin Bs; and water-soluble phosphonic acids and phosphonate salts. The term "water-soluble" in the present invention means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound may fail to achieve a sufficient effect by the water-soluble compound. On the other hand, an excessive amount of the water-soluble compound may decrease the polymerization rate or increase the amount of the residue of the polymerizable component which failed to be polymerized and formed into the microspheres.

The aqueous dispersion medium may contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double decomposition; colloidal silica; alumina sol; and magnesium hydroxide. One of or a combination of at least two of those dispersion stabilizers may be used.

The amount of the dispersion stabilizer preferably ranges from 0.1 to 100 parts by weight to 100 parts by weight of the polymerizable component, and more preferably from 0.5 to 70 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries may be used.

The aqueous dispersion medium is prepared by blending a water-soluble compound, and optionally a dispersion stabilizer and/or dispersion stabilizing auxiliary, with water (deionized water). The pH of the aqueous dispersion medium during polymerization is adjusted depending on the variants of the water-soluble compound, dispersion stabilizer, and dispersion stabilizing auxiliary.

In the production process of the present invention, the polymerization may be carried out in the presence of sodium hydroxide or the combination of sodium hydroxide and zinc chloride.

In the production process of the present invention, the oily mixture is dispersed and emulsified in the aqueous dispersion medium to be formed into oil globules of a prescribed particle size.

The methods for dispersing and suspending the oily mixture include generally known dispersion techniques, such as agitation with a Homo-mixer (for example, a device manufactured by PRIMIX Corporation), dispersion with a static dispersing apparatus such as a Static mixer (for example, a device manufactured by Noritake Engineering Co., Ltd.), membrane suspension technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be selected optionally depending on the variant of the polymerization initiator, and is preferably controlled within the range from 30 to 100° C., and more preferably from 40 to 90° C. The polymerization temperature is preferably maintained for about 1 to 20 hours. The initial pressure for the polymerization is not specifically restricted, and is preferably controlled within the range from 0 to 5 MPa in gauge pressure, and more preferably from 0.1 to 3 MPa.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be processed into dry powder with a moisture content not greater than 6 wt %, preferably not greater than 5 wt % and more preferably not greater than 4 wt %.

The cake may be washed with water and/or redispersed in water and filtered again before the drying process for the purpose of decreasing the content of the ionic substances. The slurry may also be dried with a spray dryer or fluidized bed dryer to be processed into dry powder.

Decreasing the Expansion Temperature of Heat-Expandable Microspheres

The temperature-decreasing process of the present invention decreases the expansion temperature of the heat-expandable microspheres comprising the thermoplastic resin shell and the core material encapsulated therein, and the process comprises dispersing an oily mixture containing the core material and a polymerizable component into an aqueous dispersion medium and polymerizing the polymerizable component, wherein the core material contains a thermally-vaporizable blowing agent which imparts a swelling degree of less than 5% as defined by the formula (I) mentioned above and contains the component (A) which imparts a swelling degree of 5 to 30% as defined by the formula (I) mentioned above, wherein the amount of the component (A) ranges from 0.0001 to 30 parts by weight to 100 parts by weight of the blowing agent. The details of the core material, blowing agent, component (A), polymerizable component, oily mixture, aqueous dispersion medium, polymerization process and heat-expandable microspheres are described above.

As mentioned above, the core material containing the component (A) blended with the blowing agent in a specific ratio enables the decrease of the expansion temperatures including the expansion initiation temperature and maximum expansion temperature of the heat-expandable microspheres without changing the polymerizable monomer and its ratio and/or changing the blowing agent and its ratio.

Hollow Particles

The hollow particles of the present invention are the products from thermal expansion of the heat-expandable microspheres mentioned above. The hollow particles are manufactured by thermally expanding the heat-expandable microspheres. The hollow particles are lightweight and give excellent material properties to the composition or formed product blended with the particles.

The process for manufacturing the hollow particles includes dry thermal expansion methods and wet thermal expansion methods, and the process includes the steps of conveying the heat-expandable microspheres in a hopper by vacuum feeding, pneumatic feeding or screw feeding.

The hollow particles of the present invention are manufactured by heating and expanding the heat-expandable microspheres mentioned above preferably at a temperature ranging from 50 to 400° C.

The mean particle size of the hollow particles is not specifically restricted, and is optionally designed according to the application of the particles. The mean particle size preferably ranges from 1 to 1000 μm, and more preferably from 3 to 200 μm. The coefficient of variation, CV, of the particle size distribution of the hollow particles is not specifically restricted, and preferably is not higher than 50%, and more preferably not higher than 40%.

The true specific gravity of the hollow particles is not specifically restricted, and preferably ranges from 0.005 to 0.6, more preferably from 0.015 to 0.4 and most preferably from 0.020 to 0.3. The hollow particles having a specific gravity less than 0.005 may have poor durability. On the other hand, the hollow particles having a specific gravity greater than 0.6 may not be cost-effective. This is because such hollow particles have a poor lightweight effect, and a high amount of the hollow particles is required to prepare the composition containing the hollow particles.

Figure 2:
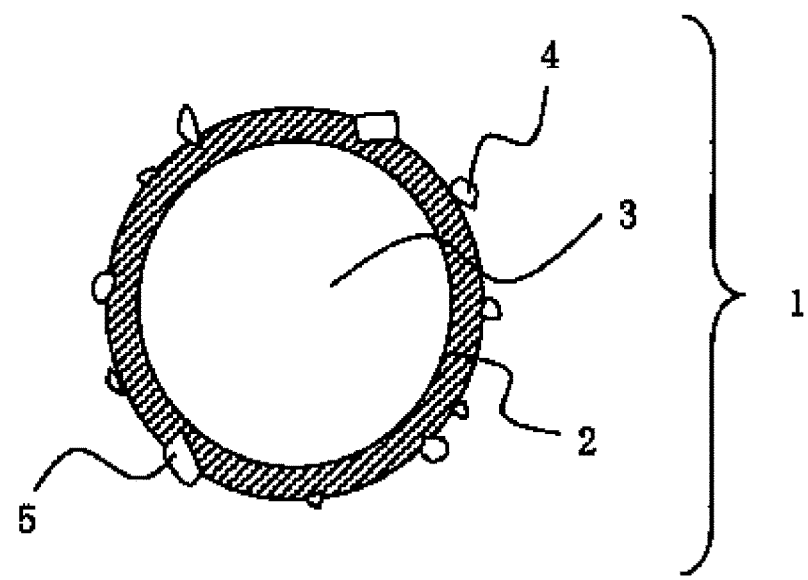
FIG. 2 is a schematic diagram of an example of the hollow particles.

The hollow particles (1) may include fine particles (4 and 5) coating the outer surface of their shell (2) as shown in FIG. 2, and such hollow particles are hereinafter also referred to as fine-particle-coated hollow particles (1).

The coating mentioned here means that the particulate filler, i.e., the fine particles (4 and 5), is in a state of adhesion (4) on the outer surface of the shell (2) of the hollow particles (1), or in a state of fixation in a dent (5) on the outer surface of the shell of the hollow particles as the result of the particulate filler pushing into the thermoplastic resin shell melted by heat. The particle shape of the particulate filler may be irregular or spherical.

The fine particles, which are added to the composition prepared by blending the hollow particles and the base component, can be adhered on the outer surface of the hollow particles before they are blended with the base component. Such work enables easy dispersion of the fine particles which are usually difficult to disperse uniformly.

The mean particle size of the fine particles is not specifically restricted, and is selected depending on the hollow particles to be coated. The mean particle size of the fine particles preferably ranges from 0.001 to 30 μm, more preferably from 0.005 to 25 μm, and most preferably from 0.01 to 20 μm.

The fine particles of various materials including both inorganic and organic substances may be employed. The shape of the fine particles includes spherical, needle-like and plate-like shapes.

The fine particles include, for example, organic fine particles including metal soaps such as magnesium stearate, calcium stearate, zinc stearate, barium stearate and lithium stearate; synthetic waxes, such as polyethylene wax, lauric amide, myristic amide, palmitic amide, stearic amide and hydrogenated castor oil; and organic fillers, such as polyacrylamide, polyimide, nylon, polymethylmethacrylate, polyethylene and polytetrafluoroethylene. The examples of inorganic fine particles include talc, mica, bentonite, sericite, carbon black, molybdenum disulfide, tungsten disulfide, carbon fluoride, calcium fluoride and boron nitride; and other inorganic fillers, such as silica, alumina, isinglass, colloidal calcium carbonate, heavy calcium carbonate, calcium hydroxide, calcium phosphate, magnesium hydroxide, magnesium phosphate, barium sulfate, titanium dioxide, zinc oxide, ceramic beads, glass beads, and crystal beads.

The mean particle size of the fine particles preferably is not greater than 10% of the mean particle size of the fine-particle-coated hollow particles. The mean particle size mentioned here is the mean particle size of the primary particles.

The fine-particle-coated hollow particles are useful for preparing a paint composition or adhesive composition by blending the hollow particles in the compositions mentioned below.

The fine-particle-coated hollow particles can be manufactured by heating and expanding the fine-particle-coated heat-expandable microspheres. A preferred process for producing the fine-particle-coated hollow particles includes the steps of blending heat-expandable microspheres and fine particles (blending step), and heating the mixture prepared in the blending step at a temperature higher than the softening point mentioned above to expand the heat-expandable microspheres and simultaneously adhere the fine particles on the outer surface of the shell of the resultant hollow particles (adhering step).

The true specific gravity of the fine-particle-coated hollow particles is not specifically restricted, and preferably ranges from 0.01 to 0.6, more preferably from 0.03 to 0.5, further more preferably from 0.05 to 0.4, and most preferably from 0.07 to 0.3. The fine-particle-coated hollow particles having a true specific gravity less than 0.01 may have poor durability. On the other hand, the fine-particle-coated hollow particles having a true specific gravity greater than 0.6 may not be cost-effective. This is because such fine-particle-coated hollow particles have a poor lightweight effect, and a high amount of the fine-particle-coated hollow particles is required to prepare the composition containing the fine-particle-coated hollow particles.

Compositions and Formed Products

The composition of the present invention contains the base component and at least one particulate material selected from the group consisting of the heat-expandable microspheres of the present invention and the hollow particles of the present invention.

The base component is not specifically restricted, and includes, for example, rubbers, such as natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluororubber and ethylene-propylene-diene rubber (EPDM); thermosetting resins, such as epoxy resins, phenolic resins, unsaturated polyester resins and polyurethane; waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), and polystyrene (PS); ionomer resins, such as ethylene ionomers, urethane ionomers, styrene ionomers and fluorine ionomers; thermoplastic elastomers, such as olefin elastomers, styrene elastomers and polyester elastomers; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers, acrylate polymers, alkyd resins, amino-alkyd resins, amino resins, chlorinated rubbers, epoxy resins, phenolic resins, fluorine resins and polyester polymers; and inorganic materials, such as cement, mortar and cordierite.

The composition of the present invention is prepared by mixing these base components and the heat-expandable microspheres and/or hollow particles. The composition prepared by mixing the base component and heat-expandable microspheres and/or hollow particles may be blended with another base component to be prepared into the composition of the present invention.

The amount of the heat-expandable microspheres and/or hollow particles preferably ranges from 0.1 to 70 parts by weight to 100 parts by weight of the base component, more preferably from 0.5 to 65 parts by weight and further more preferably from 1 to 60 parts by weight.

The process for mixing the ingredients is not specifically restricted, and are preferably mixed with a kneader, roller kneader, mixing roller, mixer, single screw kneader, twin screw kneader or multi-screw kneader.

The application of the composition of the present invention includes, for example, molding compositions; paint compositions, clay compositions, fiber compositions, adhesive compositions and powder compositions.

The composition of the present invention can be used as the master batch for resin molding if the composition contains the heat-expandable microspheres and the base component including compounds and/or thermoplastic resins having a melting point lower than the expansion initiation temperature of the heat-expandable microspheres (for example, waxes, such as polyethylene waxes and paraffin waxes; thermoplastic resins, such as ethylene-vinyl acetate copolymer (EVA), polyethylene, modified polyethylene, polyvinyl chloride (PVC), acrylic resin, thermoplastic polyurethane, acrylonitrile-styrene copolymer (AS resin), acrylonitrile-butadiene-styrene copolymer (ABS resin), and polystyrene (PS); ionomer resins, such as ethylene ionomers, urethane ionomers, styrene ionomers, and fluorine ionomers; and thermoplastic elastomers, such as olefin elastomers, styrene elastomers and polyester elastomers). The master-batch composition for resin molding is preferably employed in injection molding, extrusion molding and press molding for the purpose of introducing bubbles into molded products. Resins used for resin molding can be selected from the base component mentioned above without restriction, and include, for example, ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), olefin elastomers, styrene elastomers, polyester elastomers, natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluororubber, ethylene-propylene-diene rubber (EPDM), and their mixtures. The composition may optionally contain reinforcing fibers, such as glass fiber, carbon fiber and natural fibers; inorganic powders, such as talc, titanium oxide, silica and inorganic pigments; organic powders, such as polymer particulates including acrylic particulates, styrene particulates, urethane particulates and silicone particulates, and organic pigments; flame retardants; and chemical blowing agents.

The formed product of the present invention can be manufactured by forming the composition. The formed product of the present invention includes, for example, molded products and coating films. The formed products of the present invention have improved lightweight effect, porosity, sound absorbing performance, thermal insulation, design potential, shock absorbing performance and strength, and low thermal conductivity and dielectric property.

The formed product containing inorganic materials as the base component can be further burnt to be processed into ceramic filters and the like.

The composition and formed product of the present invention contains at least one particulate material selected from the group consisting of the heat-expandable microspheres of the present invention and the hollow particles of the present invention, and can be processed or manufactured in lower expansion temperature region.

EXAMPLES

Examples of the heat-expandable microspheres of the present invention are specifically described below, although the present invention is not restricted within the scope of these examples. The percentage (%) mentioned in the following examples and comparative examples means weight percent (wt %) unless otherwise specified.

The properties of the heat-expandable microspheres, hollow particles, compositions, and formed products were measured and their performances were evaluated by the following methods. The heat-expandable microspheres hereinafter are also referred to as "microspheres" for concise expression.

Determination of the Swelling Degree

The polymerizable component of the heat-expandable microspheres of each of Examples and Comparative examples was polymerized into the thermoplastic resin constituting the shell of the heat-expandable microspheres. The thermoplastic resin was molded in a mold 3 cm wide and 5 cm long by pressure molding with a tabletop test press (manufactured by Tester Sangyo Co., Ltd.) with heating to be formed into a test piece 3 cm wide, 5 cm long and 2 mm thick.

The resultant test piece was weighed, and then immersed in the component (A) in an environment of a temperature of 40° C. for 24 hours. Then the test piece was taken out, left in an environment of a temperature of 25° C. for 24 hours, and weighed. The swelling degree of the thermoplastic resin imparted by the component (A) (hereinafter also referred to as the swelling degree by the component (A)) is defined by the value of the following formula (I) where $M_1$ (g) is the weight of the test piece before immersing in the component (A) and $M_2$ (g) is the weight of the test piece after immersing in the component (A).

$$\text{Swelling degree } (\%) = \{(M_2 - M_1)/M_1\} \times 100 \quad (I)$$

The swelling degree of the test piece determined in the same manner as that mentioned above except that the component (A) was replaced by the blowing agent is defined as the swelling degree of the thermoplastic resin imparted by the blowing agent (hereinafter also referred to as the swelling degree by the blowing agent).

Determination of the Mean Particle Size

A sample of microspheres was analyzed with a laser diffraction-scattering particle size analyzer (Microtrac ASVR, supplied by Nikkiso). The mean volume diameter, $D_{50}$, determined in the analysis is defined as the mean particle size.

Determination of the Expansion-Initiation Temperature (Ts) and the Maximum Expansion Temperature (Tm) of Heat-Expandable Microspheres The maximum expansion temperature was determined with a DMA (DMA Q800, manufactured by TA Instruments). In an aluminum cup 4.8 mm deep and 6.0 mm in diameter, 0.5 mg of a sample of heat-expandable microspheres was placed, and the cup was covered with an aluminum cap (5.6 mm in diameter and 0.1 mm thick) to prepare a test sample. The test sample was set on the device and subjected to a pressure of 0.01 N with the compression unit of the device, and the height of the sample was measured. The sample was then heated at a temperature elevating at a rate of 10° C./min in the temperature range from 20 to 300° C., being subjected to the pressure of 0.01 N with the compression unit, and the vertical change in the position of the compression unit was measured. The temperature at which the compression unit started to move upward was determined as the expansion-initiation temperature (Ts), and the temperature at which the compression unit indicated the highest position (D max) was determined as the maximum expansion temperature ($T_m$).

The heat-expandable microspheres of Comparative Example 1 in Table 1 was produced without the component (A), and the difference between the expansion initiation temperatures or between the maximum expansion temperatures of the heat-expandable microspheres of Comparative Example 1 and the heat-expandable microspheres of the Examples and the other Comparative example in Table 1 was obtained by calculating the expressions, $T^2_s - T^1_s$ and $T^2_m - T^1_m$, where $T^2_s$ (° C.) and $T^2_m$ (° C.) respectively represent the expansion initiation temperature and maximum expansion temperature of the heat-expandable microspheres of Comparative Example 1, and $T^1_s$ (° C.) and $T^1_m$ (° C.) respectively represent the expansion initiation temperature and maximum expansion temperature of the heat-expandable microspheres of each of the Examples and the other Comparative Example in Table 1. Similarly, the difference between the expansion initiation temperatures or between the maximum expansion temperatures of the heat-expandable microspheres of Comparative Examples 3, 5, 7, 9 or 11 and the heat-expandable microspheres of the Examples and the other Comparative Example in Table 2, 3, 4, 5 or 6 was obtained by calculating the expressions, $T^2_s - T^1_s$ and $T^2_m - T^1_m$.

Comparative Example 1

An aqueous dispersion medium was prepared by adding 50 g of colloidal silica containing 20 wt % of silica, 1.0 g of polyvinyl pyrolidone and 0.1 g of carboxymethylated polyethylene imine (CMPEI, having the substituted alkyl group of —CH$_2$COONa, with 80% substitution ratio, Mw 50,000) to 600 g of deionized water and adjusting the pH of the mixture within the range of from 2.5 to 3.5. The CMPEI is the same as that described in paragraph [0140] of WO 2008/142849.

An oily mixture was prepared by mixing 150 g of vinylidene chloride, 75 g of acrylonitrile, 25 g of methyl acrylate, 0.5 g of ethylene glycol dimethacrylate, 40 g of isobutane and 4 g of a liquid containing 70% of t-hexyl peroxypivalate.

The aqueous dispersion medium and the oily mixture were mixed and agitated with a Homo-mixer (TK Homo-mixer, manufactured by PRIMIX Corporation) at 8000 rpm for 2 minutes to be prepared into a suspension. Then the suspension was transferred to a 1.5-L compressive reactor, purged with nitrogen, and polymerized at 60° C. for 20 hours with agitation at 80 rpm under an initial reaction pressure of 0.5 MPa. The resultant polymerization product was filtered and dried to be made into heat-expandable microspheres. The mean particle size, expansion-initiation temperature and maximum expansion temperature of the resultant heat-expandable microspheres were determined. The results are shown in Table 1.

Examples 1 to 7 and Comparative Example 2

Heat-expandable microspheres were produced in the same manner as that of Comparative Example 1 except that the component (A) shown in Table 1 was added to the oily mixture. The mean particle size, expansion-initiation temperature and maximum expansion temperature of the resultant heat-expandable microspheres were measured. The results are shown in Table 1. Although the heat-expandable microspheres of Comparative Example 2 were evaluated with respect to expansion-initiation temperature and maximum expansion temperature, the heat-expandable microspheres did not expand.

Examples 8 to 42 and Comparative Examples 3 to 12

Heat-expandable microspheres were produced in the same manner as that of Comparative Example 1, except that the aqueous dispersion medium and oily mixture were replaced by those shown in Tables 2 to 6. The mean particle size, expansion-initiation temperature and maximum expansion temperature of the resultant heat-expandable microspheres were measured. The results are shown in Tables 2 to 6. Although the heat-expandable microspheres of Comparative Examples 4, 6, 8, 10 and 12 were evaluated with respect to expansion-initiation temperature and maximum expansion temperature, the heat-expandable microspheres did not expand.

The heat-expandable microspheres of Comparative Example 1 (also of Examples 1 to 7 and Comparative Example 2) exhibited a 2.1% swelling degree imparted by the blowing agent, the heat-expandable microspheres of Comparative Example 3 (also of Examples 8 to 14 and Comparative Example 4) exhibited a 1.9% swelling degree imparted by the blowing agent, the heat-expandable microspheres of Comparative Example 5 (and also those of Examples 15 to 21 and Comparative Example 6) exhibited a 1.6% swelling degree imparted by the blowing agent, the heat-expandable microspheres of Comparative Example 7 (and also those of Examples 22 to 28 and Comparative Example 8) exhibited a 1.0% swelling degree imparted by the blowing agent, the heat-expandable microspheres of Comparative Example 9 (and also those of Examples 29 to 35 and Comparative Example 10) exhibited a 0.8% swelling degree imparted by the blowing agent, and the heat-expandable microspheres of Comparative Example 11 (and also those of Examples 36 to 42 and Comparative Example 12) exhibited a 0.7% swelling degree imparted by the blowing agent.

TABLE 1

| | | Com. | Example | | | | | | | Com. |
|---|---|---|---|---|---|---|---|---|---|---|
| | | 1 | 1 | 2 | 3 | 4 | 5 | 6 | 7 | 2 |
| Aqueous dispersion medium (g) | Deionized water | 600 | 600 | 600 | 600 | 600 | 600 | 600 | 600 | 600 |
| | Sodium chloride | — | — | — | — | — | — | — | — | — |
| | Colloidal silica | 50 | 50 | 50 | 50 | 50 | 50 | 50 | 50 | 50 |
| | PVP | 1 | 1 | 1 | 1 | 1 | 1 | 1 | 1 | 1 |
| | CMPEI | 0.1 | 0.1 | 0.1 | 0.1 | 0.1 | 0.1 | 0.1 | 0.1 | 0.1 |
| Polymerizable component (g) | VCl2 | 150 | 150 | 150 | 150 | 150 | 150 | 150 | 150 | 150 |
| | AN | 75 | 75 | 75 | 75 | 75 | 75 | 75 | 75 | 75 |
| | MAN | — | — | — | — | — | — | — | — | — |
| | MMA | — | — | — | — | — | — | — | — | — |

TABLE 1-continued

|  |  | Com. 1 | Example 1 | 2 | 3 | 4 | 5 | 6 | 7 | Com. 2 |
|---|---|---|---|---|---|---|---|---|---|---|
|  | MA | 25 | 25 | 25 | 25 | 25 | 25 | 25 | 25 | 25 |
|  | IBX | — | — | — | — | — | — | — | — | — |
| Cross-linking agent (g) | EDMA | 0.5 | 0.5 | 0.5 | 0.5 | 0.5 | 0.5 | 0.5 | 0.5 | 0.5 |
|  | 4EG-A | — | — | — | — | — | — | — | — | — |
|  | TMP | — | — | — | — | — | — | — | — | — |
| Polymerization initiator (g) | Perhexyl PV | 4 | 4 | 4 | 4 | 4 | 4 | 4 | 4 | 4 |
|  | OPP | — | — | — | — | — | — | — | — | — |
|  | AIBN | — | — | — | — | — | — | — | — | — |
| Blowing agent (g) | Isobutane | 40 | 40 | 40 | 40 | 40 | 40 | 40 | 40 | 40 |
|  | Isopentane | — | — | — | — | — | — | — | — | — |
| Component (A) (g) | Toluene | — | 2 | 5 | — | — | — | — | — | — |
|  | ATBC | — | — | — | 2 | 5 | — | — | — | 16 |
|  | DINA | — | — | — | — | — | 5 | — | — | — |
|  | TCP | — | — | — | — | — | — | 5 | — | — |
|  | DINP | — | — | — | — | — | — | — | 5 | — |
| Revolution rate of homomixer (rpm) |  | 8000 | 8000 | 8000 | 8000 | 8000 | 8000 | 8000 | 8000 | 8000 |
| Polymerization temp. (° C.) |  | 60 | 60 | 60 | 60 | 60 | 60 | 60 | 60 | 60 |
| Swelling degree by Component (A) (%) |  | — | 7.6 | 7.6 | 8.1 | 8.1 | 7.9 | 8.1 | 8.4 | 8.1 |
| Mean particle size (μm) |  | 12 | 12 | 13 | 13 | 12 | 12 | 13 | 11 | 13 |
| Expansion-initiation temp. (° C.) |  | 75 | 73 | 72 | 72 | 70 | 70 | 69 | 69 | — |
| Maximum expansion temp. (° C.) |  | 117 | 110 | 106 | 108 | 105 | 107 | 105 | 106 | — |

TABLE 2

|  |  | Com. 3 | Example 8 | 9 | 10 | 11 | 12 | 13 | 14 | Com. 4 |
|---|---|---|---|---|---|---|---|---|---|---|
| Aqueous dispersion medium (g) | Deionized water | 600 | 600 | 600 | 600 | 600 | 600 | 600 | 600 | 600 |
|  | Sodium chloride | — | — | — | — | — | — | — | — | — |
|  | Colloidal silica | 50 | 50 | 50 | 50 | 50 | 50 | 50 | 50 | 50 |
|  | PVP | 1 | 1 | 1 | 1 | 1 | 1 | 1 | 1 | 1 |
|  | CMPEI | 0.1 | 0.1 | 0.1 | 0.1 | 0.1 | 0.1 | 0.1 | 0.1 | 0.1 |
| Polymerizable component (g) | VCl2 | 120 | 120 | 120 | 120 | 120 | 120 | 120 | 120 | 120 |
|  | AN | 100 | 100 | 100 | 100 | 100 | 100 | 100 | 100 | 100 |
|  | MAN | — | — | — | — | — | — | — | — | — |
|  | MMA | 30 | 30 | 30 | 30 | 30 | 30 | 30 | 30 | 30 |
|  | MA | — | — | — | — | — | — | — | — | — |
|  | IBX | — | — | — | — | — | — | — | — | — |
| Cross-linking agent (g) | EDMA | 0.5 | 0.5 | 0.5 | 0.5 | 0.5 | 0.5 | 0.5 | 0.5 | 0.5 |
|  | 4EG-A | — | — | — | — | — | — | — | — | — |
|  | TMP | — | — | — | — | — | — | — | — | — |
| Polymerization initiator (g) | Perhexyl PV | — | — | — | — | — | — | — | — | — |
|  | OPP | 4 | 4 | 4 | 4 | 4 | 4 | 4 | 4 | 4 |
|  | AIBN | — | — | — | — | — | — | — | — | — |
| Blowing agent (g) | Isobutane | 40 | 40 | 40 | 40 | 40 | 40 | 40 | 40 | 40 |
|  | Isopentane | — | — | — | — | — | — | — | — | — |
| Component (A) (g) | Toluene | — | 2 | 5 | — | — | — | — | — | — |
|  | ATBC | — | — | — | 2 | 5 | — | — | — | 16 |
|  | DINA | — | — | — | — | — | 5 | — | — | — |
|  | TCP | — | — | — | — | — | — | 5 | — | — |
|  | DINP | — | — | — | — | — | — | — | 5 | — |
| Revolution rate of homomixer (rpm) |  | 8000 | 8000 | 8000 | 8000 | 8000 | 8000 | 8000 | 8000 | 8000 |
| Polymerization temp. (° C.) |  | 55 | 55 | 55 | 55 | 55 | 55 | 55 | 55 | 55 |
| Swelling degree by Component (A) (%) |  | — | 7.2 | 7.2 | 7.9 | 7.9 | 7.7 | 7.9 | 8.2 | 7.9 |
| Mean particle size (μm) |  | 14 | 15 | 15 | 13 | 16 | 15 | 16 | 14 | 16 |
| Expansion-initiation temp. (° C.) |  | 80 | 78 | 77 | 77 | 75 | 76 | 75 | 74 | — |
| Maximum expansion temp. (° C.) |  | 120 | 115 | 112 | 111 | 108 | 110 | 109 | 107 | — |

TABLE 3

|  |  | Com. 5 | Example 15 | 16 | 17 | 18 | 19 | 20 | 21 | Com. 6 |
|---|---|---|---|---|---|---|---|---|---|---|
| Aqueous dispersion medium (g) | Deionized water | 600 | 600 | 600 | 600 | 600 | 600 | 600 | 600 | 600 |
|  | Sodium chloride | 150 | 150 | 150 | 150 | 150 | 150 | 150 | 150 | 150 |

TABLE 3-continued

|  |  | Com. 5 | Example 15 | 16 | 17 | 18 | 19 | 20 | 21 | Com. 6 |
|---|---|---|---|---|---|---|---|---|---|---|
|  | Colloidal silica | 70 | 70 | 70 | 70 | 70 | 70 | 70 | 70 | 70 |
|  | PVP | 1 | 1 | 1 | 1 | 1 | 1 | 1 | 1 | 1 |
|  | CMPEI | 0.1 | 0.1 | 0.1 | 0.1 | 0.1 | 0.1 | 0.1 | 0.1 | 0.1 |
| Polymerizable | VCl2 | — | — | — | — | — | — | — | — | — |
| component(g) | AN | 120 | 120 | 120 | 120 | 120 | 120 | 120 | 120 | 120 |
|  | MAN | — | — | — | — | — | — | — | — | — |
|  | MMA | 120 | 120 | 120 | 120 | 120 | 120 | 120 | 120 | 120 |
|  | MA | 30 | 30 | 30 | 30 | 30 | 30 | 30 | 30 | 30 |
|  | IBX | — | — | — | — | — | — | — | — | — |
| Cross-linking | EDMA | — | — | — | — | — | — | — | — | — |
| agent (g) | 4EG-A | 0.3 | 0.3 | 0.3 | 0.3 | 0.3 | 0.3 | 0.3 | 0.3 | 0.3 |
|  | TMP | — | — | — | — | — | — | — | — | — |
| Polymerization | Perhexyl PV | — | — | — | — | — | — | — | — | — |
| initiator(g) | OPP | 5 | 5 | 5 | 5 | 5 | 5 | 5 | 5 | 5 |
|  | AIBN | — | — | — | — | — | — | — | — | — |
| Blowing agent (g) | Isobutane | 50 | 50 | 50 | 50 | 50 | 50 | 50 | 50 | 50 |
|  | Isopentane | — | — | — | — | — | — | — | — | — |
| Component (A) (g) | Toluene | — | 5 | 10 | — | — | — | — | — | 20 |
|  | ATBC | — | — | — | 5 | 10 | — | — | — | — |
|  | DINA | — | — | — | — | — | 10 | — | — | — |
|  | TCP | — | — | — | — | — | — | 10 | — | — |
|  | DINP | — | — | — | — | — | — | — | 10 | — |
| Revolution rate of homomixer (rpm) |  | 12000 | 12000 | 12000 | 12000 | 12000 | 12000 | 12000 | 12000 | 12000 |
| Polymerization temp. (° C.) |  | 55 | 55 | 55 | 55 | 55 | 55 | 55 | 55 | 55 |
| Swelling degree by Component (A) (%) |  | — | 7 | 7 | 7.3 | 7.3 | 7.1 | 7.2 | 7.4 | 7 |
| Mean particle size (μm) |  | 13 | 13 | 13 | 14 | 15 | 14 | 13 | 14 | 15 |
| Expansion-initiation temp. (° C.) |  | 81 | 78 | 76 | 77 | 76 | 77 | 75 | 76 | — |
| Maximum expansion temp. (° C.) |  | 115 | 113 | 111 | 111 | 107 | 112 | 107 | 105 | — |

TABLE 4

|  |  | Com. 7 | Example 22 | 23 | 24 | 25 | 26 | 27 | 28 | Com. 8 |
|---|---|---|---|---|---|---|---|---|---|---|
| Aqueous dispersion | Deionized water | 600 | 600 | 600 | 600 | 600 | 600 | 600 | 600 | 600 |
| medium (g) | Sodium chloride | — | — | — | — | — | — | — | — | — |
|  | Colloidal silica | 50 | 50 | 50 | 50 | 50 | 50 | 50 | 50 | 50 |
|  | PVP | 1 | 1 | 1 | 1 | 1 | 1 | 1 | 1 | 1 |
|  | CMPEI | 0.1 | 0.1 | 0.1 | 0.1 | 0.1 | 0.1 | 0.1 | 0.1 | 0.1 |
| Polymerizable | VCl2 | — | — | — | — | — | — | — | — | — |
| component(g) | AN | 150 | 150 | 150 | 150 | 150 | 150 | 150 | 150 | 150 |
|  | MAN | — | — | — | — | — | — | — | — | — |
|  | MMA | 150 | 150 | 150 | 150 | 150 | 150 | 150 | 150 | 150 |
|  | MA | — | — | — | — | — | — | — | — | — |
|  | IBX | — | — | — | — | — | — | — | — | — |
| Cross-linking | EDMA | — | — | — | — | — | — | — | — | — |
| agent (g) | 4EG-A | 0.1 | 0.1 | 0.1 | 0.1 | 0.1 | 0.1 | 0.1 | 0.1 | 0.1 |
|  | TMP | — | — | — | — | — | — | — | — | — |
| Polymerization | Perhexyl PV | — | — | — | — | — | — | — | — | — |
| initiator(g) | OPP | 5 | 5 | 5 | 5 | 5 | 5 | 5 | 5 | 5 |
|  | AIBN | — | — | — | — | — | — | — | — | — |
| Blowing agent (g) | Isobutane | 40 | 40 | 40 | 40 | 40 | 40 | 40 | 40 | 40 |
|  | Isopentane | — | — | — | — | — | — | — | — | — |
| Component (A) (g) | Toluene | — | 4 | 10 | — | — | — | — | — | 20 |
|  | ATBC | — | — | — | 4 | 8 | — | — | — | — |
|  | DINA | — | — | — | — | — | 8 | — | — | — |
|  | TCP | — | — | — | — | — | — | 8 | — | — |
|  | DINP | — | — | — | — | — | — | — | 8 | — |
| Revolution rate of homomixer (rpm) |  | 10000 | 10000 | 10000 | 10000 | 10000 | 10000 | 10000 | 10000 | 10000 |
| Polymerization temp. (° C.) |  | 55 | 55 | 55 | 55 | 55 | 55 | 55 | 55 | 55 |
| Swelling degree by Component (A) (%) |  | — | 6.2 | 6.2 | 6.4 | 6.4 | 6.3 | 6.5 | 6.4 | 6.2 |
| Mean particle size (μm) |  | 12 | 11 | 13 | 12 | 14 | 12 | 13 | 13 | 15 |
| Expansion-initiation temp. (° C.) |  | 99 | 98 | 97 | 97 | 95 | 96 | 94 | 95 | — |
| Maximum expansion temp. (° C.) |  | 126 | 123 | 121 | 123 | 121 | 122 | 120 | 120 | — |

TABLE 5

|  |  | Com. 9 | Example 29 | Example 30 | Example 31 | Example 32 | Example 33 | Example 34 | Example 35 | Com. 10 |
|---|---|---|---|---|---|---|---|---|---|---|
| Aqueous dispersion medium (g) | Deionized water | 600 | 600 | 600 | 600 | 600 | 600 | 600 | 600 | 600 |
|  | Sodium chloride | 150 | 150 | 150 | 150 | 150 | 150 | 150 | 150 | 150 |
|  | Colloidal silica | 70 | 70 | 70 | 70 | 70 | 70 | 70 | 70 | 70 |
|  | PVP | 1 | 1 | 1 | 1 | 1 | 1 | 1 | 1 | 1 |
|  | CMPEI | 0.1 | 0.1 | 0.1 | 0.1 | 0.1 | 0.1 | 0.1 | 0.1 | 0.1 |
| Polymerizable component(g) | VCl2 | — | — | — | — | — | — | — | — | — |
|  | AN | 150 | 150 | 150 | 150 | 150 | 150 | 150 | 150 | 150 |
|  | MAN | 120 | 120 | 120 | 120 | 120 | 120 | 120 | 120 | 120 |
|  | MMA | 30 | 30 | 30 | 30 | 30 | 30 | 30 | 30 | 30 |
|  | MA | — | — | — | — | — | — | — | — | — |
|  | IBX | — | — | — | — | — | — | — | — | — |
| Cross-linking agent (g) | EDMA | — | — | — | — | — | — | — | — | — |
|  | 4EG-A | — | — | — | — | — | — | — | — | — |
|  | TMP | 0.1 | 0.1 | 0.1 | 0.1 | 0.1 | 0.1 | 0.1 | 0.1 | 0.1 |
| Polymerization initiator(g) | Perhexyl PV | — | — | — | — | — | — | — | — | — |
|  | OPP | — | — | — | — | — | — | — | — | — |
|  | AIBN | 2 | 2 | 2 | 2 | 2 | 2 | 2 | 2 | 2 |
| Blowing agent (g) | Isobutane | — | — | — | — | — | — | — | — | — |
|  | Isopentane | 50 | 50 | 50 | 50 | 50 | 50 | 50 | 50 | 50 |
| Component (A) (g) | Toluene | — | 5 | 10 | — | — | — | — | — | — |
|  | ATBC | — | — | — | 5 | 10 | — | — | — | — |
|  | DINA | — | — | — | — | — | 10 | — | — | — |
|  | TCP | — | — | — | — | — | — | 10 | — | — |
|  | DINP | — | — | — | — | — | — | — | 10 | 25 |
| Revolution rate of homomixer (rpm) |  | 10000 | 10000 | 10000 | 10000 | 10000 | 10000 | 10000 | 10000 | 10000 |
| Polymerization temp. (° C.) |  | 70 | 70 | 70 | 70 | 70 | 70 | 70 | 70 | 70 |
| Swelling degree by Component (A) (%) |  | — | 5.6 | 5.6 | 5.9 | 5.9 | 5.7 | 5.8 | 5.9 | 5.9 |
| Mean particle size (μm) |  | 22 | 21 | 23 | 22 | 23 | 24 | 23 | 22 | 24 |
| Expansion-initiation temp. (° C.) |  | 132 | 131 | 130 | 130 | 128 | 130 | 129 | 127 | — |
| Maximum expansion temp. (° C.) |  | 172 | 170 | 167 | 168 | 165 | 169 | 165 | 164 | — |

TABLE 6

|  |  | Com. 11 | Example 36 | Example 37 | Example 38 | Example 39 | Example 40 | Example 41 | Example 42 | Com. 12 |
|---|---|---|---|---|---|---|---|---|---|---|
| Aqueous dispersion medium (g) | Deionized water | 600 | 600 | 600 | 600 | 600 | 600 | 600 | 600 | 600 |
|  | Sodium chloride | 150 | 150 | 150 | 150 | 150 | 150 | 150 | 150 | 150 |
|  | Colloidal silica | 70 | 70 | 70 | 70 | 70 | 70 | 70 | 70 | 70 |
|  | PVP | 1 | 1 | 1 | 1 | 1 | 1 | 1 | 1 | 1 |
|  | CMPEI | 0.1 | 0.1 | 0.1 | 0.1 | 0.1 | 0.1 | 0.1 | 0.1 | 0.1 |
| Polymerizable component(g) | VCl2 | — | — | — | — | — | — | — | — | — |
|  | AN | 150 | 150 | 150 | 150 | 150 | 150 | 150 | 150 | 150 |
|  | MAN | 120 | 120 | 120 | 120 | 120 | 120 | 120 | 120 | 120 |
|  | MMA | — | — | — | — | — | — | — | — | — |
|  | MA | — | — | — | — | — | — | — | — | — |
|  | IBX | 30 | 30 | 30 | 30 | 30 | 30 | 30 | 30 | 30 |
| Cross-linking agent (g) | EDMA | — | — | — | — | — | — | — | — | — |
|  | 4EG-A | — | — | — | — | — | — | — | — | — |
|  | TMP | 0.5 | 0.5 | 0.5 | 0.5 | 0.5 | 0.5 | 0.5 | 0.5 | 0.5 |
| Polymerization initiator(g) | Perhexyl PV | — | — | — | — | — | — | — | — | — |
|  | OPP | — | — | — | — | — | — | — | — | — |
|  | AIBN | 2 | 2 | 2 | 2 | 2 | 2 | 2 | 2 | 2 |
| Blowing agent (g) | Isobutane | — | — | — | — | — | — | — | — | — |
|  | Isopentane | 50 | 50 | 50 | 50 | 50 | 50 | 50 | 50 | 50 |
| Component (A) (g) | Toluene | — | 5 | 10 | — | — | — | — | — | — |
|  | ATBC | — | — | — | 5 | 10 | — | — | — | — |
|  | DINA | — | — | — | — | — | 10 | — | — | — |
|  | TCP | — | — | — | — | — | — | 10 | — | — |
|  | DINP | — | — | — | — | — | — | — | 10 | 25 |
| Revolution rate of homomixer (rpm) |  | 10000 | 10000 | 10000 | 10000 | 10000 | 10000 | 10000 | 10000 | 10000 |
| Polymerization temp. (° C.) |  | 70 | 70 | 70 | 70 | 70 | 70 | 70 | 70 | 70 |
| Swelling degree by Component (A) (%) |  | — | 5.5 | 5.5 | 5.7 | 5.7 | 5.6 | 5.7 | 5.8 | 5.8 |
| Mean particle size (μm) |  | 24 | 25 | 25 | 24 | 26 | 25 | 23 | 25 | 25 |
| Expansion-initiation temp. (° C.) |  | 135 | 134 | 133 | 133 | 131 | 132 | 130 | 130 | — |
| Maximum expansion temp. (° C.) |  | 175 | 173 | 171 | 172 | 170 | 171 | 170 | 169 | — |

The names of the monomer components and cross-linking agents are abbreviated in Tables 1 to 6 as described below.

PVP: polyvinyl pyrolidone

CMPEI: polyethylene imines (having the substituted alkyl group of —$CH_2COONa$, with 80% substitution ratio, Mw 50,000), sometimes described as carboxymethylated polyethylene imine sodium salt VCl2: vinylidene chloride monomer AN: acrylonitrile MAN: methacrylonitrile MMA: methyl methacrylate MA: methyl acrylate IBX: isobornyl methacrylate EDMA: ethylene glycol dimethacrylate 4EG-A: PEG (200) dimethacrylate TMP: trimethylolpropane trimethacrylate Perhexyl PV: t-hexyl peroxypivalate (70% conc.)

OPP: di-2-ethylhexyl peroxydicarbonate (70% conc.)

AIBN: azobisisobutylonitrile

ATBC: acetyl tributyl citrate

DINA: diisononyl adipate

TCP: tricresyl phosphate

DINP: diisononyl phthalate

Toluene has a solubility parameter of 9.1, ATBC has a solubility parameter of 9.8, DINA has a solubility parameter of 8.7, TCP has a solubility parameter of 10.5, and DINP has a solubility parameter of 9.4.

The heat-expandable microspheres of Examples 1 to 36 have expansion-initiation temperatures and maximum expansion temperatures lower than that of the heat-expandable microspheres of Comparative Examples 1 to 12, and exhibit good expansion performance at low temperature.

INDUSTRIAL APPLICABILITY

The heat-expandable microspheres of the present invention can be used as a light weight additive to putties, paints, inks, sealants, mortar, paper clays and porcelains, or can be added to base components which are formed by injection molding, extrusion molding or press molding into formed products having good sound insulation properties, thermal insulation properties, heat shielding properties and sound absorbing properties. The composition and formed product of the present invention can be processed or manufactured in a lower expansion temperature region.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. Heat-expandable microspheres comprising a thermoplastic resin shell and a core material encapsulated therein;
the core material containing a thermally-vaporizable blowing agent which imparts a swelling degree of less than 5% as defined by the following formula (I) and contains a component (A) which imparts a swelling degree of 5 to 30% as defined by the following formula (I);
wherein the component (A) comprises alkyl-substituted aromatic compounds, an amount of the component (A) ranges from 0.0001 to 30 parts by weight to 100 parts by weight of the blowing agent;
the blowing agent is at least one selected from straight-chain hydrocarbons, branched hydrocarbons and alicyclic hydrocarbons; and
the thermoplastic resin is obtained by polymerizing a polymerizable component containing a nitrile monomer, and an amount of the nitrile monomers in the polymerizable component ranges from 5 to 95 wt %;

$$\text{Swelling degree (\%)} = \{(M_2 - M_1)/M_1\} \times 100 \qquad (I)$$

where $M_1$ is the weight (g) of a test piece (1) of a thermoplastic resin constituting the shell of the heat-expandable microspheres, and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

2. The heat-expandable microspheres as claimed in claim 1, wherein the component (A) has a solubility parameter ranging from 8 to 15.

3. The heat-expandable microspheres as claimed in claim 1, wherein the maximum expansion temperature of the heat-expandable microspheres ranges from 80 to 200° C.

4. The heat-expandable microspheres as claimed in claim 1, wherein the expansion initiation temperature of the heat-expandable microspheres ranges from 50 to 150° C.

5. The heat-expandable microspheres as claimed in claim 1, wherein the maximum expansion temperature, $T^1_m$ (° C.), of the heat-expandable microspheres and the maximum expansion temperature, $T^2_m$ (° C.), of the heat-expandable microspheres produced with the same components as that of the former except the component (A) satisfy the following formula (II):

$$T^2_m - T^1_m > 3 \qquad (II).$$

6. A process for producing heat-expandable microspheres comprising a thermoplastic resin shell and a core material encapsulated therein;
the process comprising dispersing an oily mixture containing the core material and a polymerizable component into an aqueous dispersion medium, and polymerizing the polymerizable component;
wherein the core material contains a thermally-vaporizable blowing agent which imparts a swelling degree of less than 5% as defined by the following formula (I) and contains a component (A) imparts a swelling degree of 5 to 30% as defined by the following formula (I);
wherein the component (A) comprises alkyl-substituted aromatic compounds, an amount of the component (A) ranges from 0.0001 to 30 parts by weight to 100 parts by weight of the blowing agent;
the blowing agent is at least one selected from straight-chain hydrocarbons, branched hydrocarbons and alicyclic hydrocarbons; and
the thermoplastic resin is obtained by polymerizing a polymerizable component containing a nitrile monomer, and an amount of the nitrile monomers in the polymerizable component ranges from 5 to 95 wt %;

$$\text{Swelling degree (\%)} = \{(M_2 - M_1)/M_1\} \times 100 \qquad (I)$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

7. Hollow particles manufactured by expanding the heat-expandable microspheres as claimed in claim 1.

8. A composition containing a base component and the heat-expandable microspheres as claimed in claim 1.

9. A formed product manufactured by forming the composition as claimed in claim 8.

10. A composition containing a base component and the hollow particles as claimed in claim 7.

11. A formed product manufactured by forming the composition as claimed in claim 10.

12. The heat-expandable microspheres as claimed in claim 1, wherein the polymerizable component contains a vinylidene chloride monomer, and the amount of the vinylidene chloride in the polymerizable component ranges from 1 to 90 wt %.

13. The heat-expandable microspheres as claimed in claim 1, wherein
the blowing agent contains at least one selected from the group comprising propane, butane, pentane, hexane, heptane, isobutane, isopentane, isohexane, isoheptane, isooctane, cyclopentane and cyclohexane.

14. The heat-expandable microspheres as claimed in claim 1, wherein the component (A) is toluene.

15. A temperature-decreasing process for decreasing an expansion temperature of heat-expandable microspheres comprising a thermoplastic resin shell and a core material encapsulated therein;
the process comprising dispersing an oily mixture containing the core material and a polymerizable component into an aqueous dispersion medium and polymerizing the polymerizable component;
wherein the core material contains a thermally-vaporizable blowing agent which imparts a swelling degree of less than 5% as defined by the following formula (I) and contains a component (A) which imparts a swelling degree of 5 to 30% as defined by the following formula (I);
wherein the component (A) comprises alkyl-substituted aromatic compounds, an amount of the component (A) ranges from 0.0001 to 30 parts by weight to 100 parts by weight of the blowing agent;
the blowing agent is at least one selected from straight-chain hydrocarbons, branched hydrocarbons and alicyclic hydrocarbons; and
the thermoplastic resin is obtained by polymerizing a polymerizable component containing a nitrile monomer, and an amount of the nitrile monomers in the polymerizable component ranges from 5 to 95 wt %;

$$\text{Swelling degree (\%)} = \{(M_2 - M_1)/M_1\} \times 100 \quad \text{(I)}$$

where $M_1$ is the weight (g) of a test piece (1) of a thermoplastic resin constituting the shell of the heat-expandable microspheres; and $M_2$ is the weight (g) of a test piece (2) which is obtained by immersing the test piece (1) in the blowing agent or by immersing the component (A) in an environment of a temperature of 40° C. for 24 hours, and then taking out the test piece and leaving it in an environment of a temperature of 25° C. for 24 hours.

* * * * *